(12) United States Patent
McArdle et al.

(10) Patent No.: US 8,326,902 B2
(45) Date of Patent: Dec. 4, 2012

(54) ONLINE DATABASE MODELING

(75) Inventors: Leon James McArdle, Berkshire (GB); Mark Paul Hamilton Warner, Bath (GB); John Laurence Cobb, Berkshire (GB)

(73) Assignee: Oracle International Corporation, Redwood Shores, CA (US)

( * ) Notice: Subject to any disclaimer, the term of this patent is extended or adjusted under 35 U.S.C. 154(b) by 151 days.

(21) Appl. No.: 12/869,972

(22) Filed: Aug. 27, 2010

(65) Prior Publication Data
US 2011/0082889 A1 Apr. 7, 2011

Related U.S. Application Data

(60) Provisional application No. 61/249,513, filed on Oct. 7, 2009.

(51) Int. Cl.
*G06F 17/30* (2006.01)
(52) U.S. Cl. .................... 707/972; 707/679; 707/802
(58) Field of Classification Search .............. 707/792, 707/802, 679
See application file for complete search history.

(56) References Cited

U.S. PATENT DOCUMENTS

| 5,980,096 A * | 11/1999 | Thalhammer-Reyero ............ 1/1 |
| 7,143,120 B2 * | 11/2006 | Oks et al. ...................... 707/679 |
| 7,546,312 B1 * | 6/2009 | Xu et al. ............................. 1/1 |
| 7,885,978 B2 * | 2/2011 | Dumitrascu et al. ........... 707/802 |
| 2006/0010157 A1 * | 1/2006 | Dumitrascu et al. .......... 707/102 |

* cited by examiner

*Primary Examiner* — Jean M Corrielus
(74) *Attorney, Agent, or Firm* — Kilpatrick Townsend & Stockton LLP (57) ABSTRACT

Aspects of the present invention relate to methods and system of implementing online database modeling. The method includes providing an database modeling diagram framework. The framework is in communication with an online database, and the online database provides access to live data. The method further includes providing online access to the online database for the database modeling diagram framework via an intermediary API, representing a database structure of the online database in a database model within an interface of the database modeling diagram framework, and populating the database model with live data from the online database. Further, the method includes displaying the database model with the live data from the online database within the database modeling diagram framework interface.

7 Claims, 8 Drawing Sheets

ONLINE DATABASE MODELING

PRIORITY CLAIM

This application claims priority to U.S. Provisional Application No. 61/249,513, filed on Oct. 7, 2009, entitled, ONLINE DATABASE MODELING, which is incorporated by reference in its entirety for any and all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, to databases and, more particularly, to online database modeling.

BACKGROUND

Presently, database modeling is done with an "offline" model in some form of repository or on a file system. This means that all database modeling is usually done in a two-step process by 1) capturing an existing model into offline form, and then 2) editing the model to reconciling the two models. This is imprecise and error prone, and this process requires additional unneeded steps (e.g., reconciliation). Most database modeling tools are used to 1) create an offline model "from scratch" or by capture/import from an online database, 2) edit the offline model, or 3) reconcile the online database with the offline model. This could involve updating the offline model to reflect changes in the online database, updating the online database to reflect changes in the offline model, or both. Updating the online database involves generation of SQL DDL commands, either executed directly against the online database or saved to a file for later execution. There are many shortcomings with these processes. Hence, improvements in the art are needed.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

SUMMARY OF THE INVENTION

Embodiments of the present invention include a method of implementing online database modeling. The method includes providing an database modeling diagram framework. The framework is in communication with an online database, and the online database provides access to live data. The method further includes providing, via an intermediary API, access to the online database for the database modeling diagram framework, representing a database structure of the online database in a database model within an interface of the database modeling diagram framework, and populating the database model with live data from the online database. Further, the method includes displaying the database model with the live data from the online database within the database modeling diagram framework interface.

According to a further embodiment, a computer-readable medium is disclosed. The machine-readable medium includes instructions for providing an database modeling diagram framework. The framework is in communication with an online database, and the online database provides access to live data. The computer-readable medium further includes instructions for providing, via an intermediary API, access to the online database for the database modeling diagram framework, representing a database structure of the online database in a database model within an interface of the database modeling diagram framework, and populating the database model with live data from the online database. Further, the computer-readable medium includes instructions for displaying the database model with the live data from the online database within the database modeling diagram framework interface.

according to yet another embodiment, a system for implementing online database modeling, is described. The system includes a computer system configured to provide an database modeling diagram framework. The framework is in communication with an online database, and the online database provides access to live data. The system further includes an online database in communication with the framework via an intermediary API. The database modeling diagram framework is further configured to represent a database structure of the online database in a database model within an interface of the database modeling diagram framework, populate the database model with live data from the online database, and display the database model with the live data from the online database within the database modeling diagram framework interface.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Aspects of the present invention relate to making changes directly to an online database object(s), such that no reconcile process is needed for when the model is changed on the diagram, hence, there is no reconciliation process needed for when the model is changed on the diagram. Further, there is no need to maintain a file system or repository for the offline model. The diagram accurately represents what is currently in the database (an offline model, in contrast, may or may not be up to date). Therefore, there is a quick-and-easy way of changing the database model.

Further aspects of the present invention relate to the display of online database objects from a live database connection on a database diagram. In implementing modeling of online database objects on a diagram, one ambition is to make modeling in online as rich as it is in offline. There are naturally more restrictions to editing objects in the online world and so one aspect of the present invention is to distinguish visually between offline and online database objects on a diagram. Nonetheless, the modeling of online objects should be similar to modeling offline objects, in accordance with the present invention.

In one embodiment, creation, editing, and deletion of online database objects can be achieved using the database modeler. Furthermore, standard diagram functionality is also available. For example, laying out of online objects in a diagram, saving a diagram, setting display preferences against the diagram graphics, editing the online objects via in place edit, etc. are all available for online database object modeling.

Additionally, a database diagram would have its own component palette, drag and drop behavior and so on. The present invention enhances existing database diagram type to support online objects with full functionality. Such diagrams may contain graphics representing objects from offline databases, online databases, or both.

An underpinning of the present invention is how to deal with the type of database object. For example, an offline table has type TABLE and an online table has type TABLE. A table diagram graphic has type TABLE, the present invention continues to allow this situation to exist, which means that as far as the modeler is concerned, there are no "offline tables" or "online tables", just "tables". Which in turn provides flexibility and robustness in the present invention.

Creating online objects includes creating a table in the default database in an online database. If there is no default, the user may be prompted to provide one. Further, users are be able to set an online database as the default location for new objects. For example, since online tables cannot be defined without columns; thus, a new online table on the diagram will need a default column created for it. Alternatively, creating a new online object on the diagram could cause the corresponding create dialog to be displayed. For example, a user interface which prompts the user to define columns and other necessary information when creating a new table.

For editing, since updating online database objects is more restrictive than offline, an API will handle editing. Further, if the user cannot edit a given object, the database modeler will simply display the received error message and not allow the update. With regard to opening an online diagram, the possibility exists where a user might open a diagram for a database which happens to be down or the user does not have access rights. In these situations, a red cross (or similar designation) may appear against graphics on the diagram representing the database objects.

In online modeling, dragging and dropping allows for the online objects to be placed on the diagram. One example of an interface for dropping an dropping objects is in FIG. 6. For accessibility purposes, the option of navigating the online database through an add to diagram dialog is presented.

A further aspect of the present invention is to provide the option of distinguishing between offline and online database objects. One aspect is to have the source database displayable with a graphical representation of designation. For example, some sort of icon or graphic which designates that the database is online. Thus, the user will be put on notice that the live data is present and being manipulated. A distinction between data and metadata should be drawn here. For example, metadata represents information on the structure of the objects themselves (e.g., what a table is called, how many columns it has, what their data types are, etc.), whereas data represents actual data included with the tables and fields of the database. As such, when taking actions, such as those involved in modifying an existing table in an online database, modifying of metadata as part of design changes (e.g., removing a column), but such a change could remove all of the employee names held in that column (i.e., data).

Furthermore, when updating an offline database object, the diagram graphic will update itself. This is because the offline API sends update events whenever there is a change. The online objects may not have the same ability, but the user may be provided with a "refresh" option to redraw diagram objects.

Figure 1:
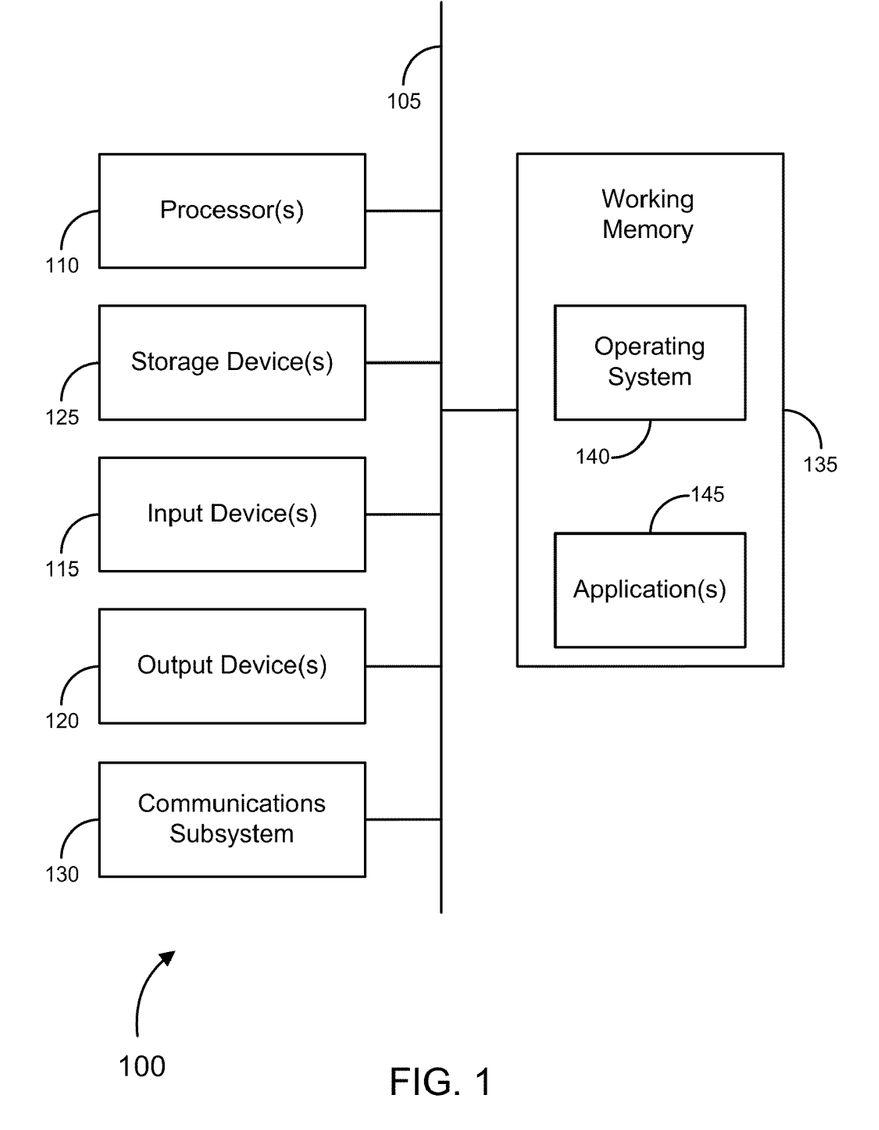
FIG. 1 is a generalized schematic diagram illustrating a computer system, in accordance with various embodiments of the present invention.

FIG. 1 provides a schematic illustration of one embodiment of a computer system 100 that can perform the methods of the invention, as described herein. It should be noted that FIG. 1 is meant only to provide a generalized illustration of various components, any or all of which may be utilized as appropriate. FIG. 1, therefore, broadly illustrates how individual system elements may be implemented in a relatively separated or relatively more integrated manner.

The computer system 100 is shown comprising hardware elements that can be electrically coupled via a bus 105 (or may otherwise be in communication, as appropriate). The hardware elements can include one or more processors 110, including without limitation, one or more general purpose processors and/or one or more special purpose processors (such as digital signal processing chips, graphics acceleration chips, and/or the like); one or more input devices 115, which can include without limitation a mouse, a keyboard and/or the like; and one or more output devices 120, which can include without limitation a display device, a printer and/or the like.

The computer system 100 may further include (and/or be in communication with) one or more storage devices 125, which can comprise, without limitation, local and/or network accessible storage and/or can include, without limitation, a disk drive, a drive array, an optical storage device, a solid state storage device such as a random access memory ("RAM")

and/or a read-only memory ("ROM"), which can be programmable, flash updateable and/or the like. The computer system 100 might also include a communications subsystem 130, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 130 may permit data to be exchanged with a network (such as the network described below, to name one example), and/or any other devices described herein. In many embodiments, the computer system 100 will further comprise a working memory 135, which can include a RAM or ROM device, as described above.

The computer system 100 also can comprise software elements, shown as being currently located within the working memory 135, including an operating system 140 and/or other code, such as one or more application programs 145, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 125 described above. In some cases, the storage medium might be incorporated within a computer system, such as the system 100. In other embodiments, the storage medium might be separate from a computer system (i.e., a removable medium, such as a compact disc, etc.), and is provided in an installation package, such that the storage medium can be used to program a general purpose computer with the instructions/code stored thereon. These instructions might take the form of executable code, which is executable by the computer system 100 and/or might take the form of source and/or installable code, which, upon compilation and/or installation on the computer system 100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 100) to perform methods of the invention. According to a set of embodiments, some or all of the procedures of such methods are performed by the computer system 100 in response to processor 110 executing one or more sequences of one or more instructions (which might be incorporated into the operating system 140 and/or other code, such as an application program 145) contained in the working memory 135. Such instructions may be read into the working memory 135 from another machine-readable medium, such as one or more of the storage device(s) 125. Merely by way of example, execution of the sequences of instructions contained in the working memory 135 might cause the processor(s) 110 to perform one or more procedures of the methods described herein.

The terms "machine-readable medium" and "computer readable medium," as used herein, refer to any medium that participates in providing data that causes a machine to operate in a specific fashion. In an embodiment implemented using the computer system 100, various machine-readable media might be involved in providing instructions/code to processor(s) 110 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 125. Volatile media includes, without limitation, dynamic memory, such as the working memory 135. Transmission media includes coaxial cables, copper wire and fiber optics, including the wires that comprise the bus 105, as well as the various components of the communications subsystem 130 (and/or the media by which the communications subsystem 130 provides communication with other devices). Hence, transmission media can also take the form of waves (including without limitation radio, acoustic and/or light waves, such as those generated during radio wave and infrared data communications).

Common forms of physical and/or tangible computer-readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 130 (and/or components thereof) generally will receive the signals, and the bus 105 then might carry the signals (and/or the data, instructions, etc., carried by the signals) to the working memory 135, from which the processor(s) 110 retrieves and executes the instructions. The instructions received by the working memory 135 may optionally be stored on a storage device 125 either before or after execution by the processor(s) 110.

Figure 2:
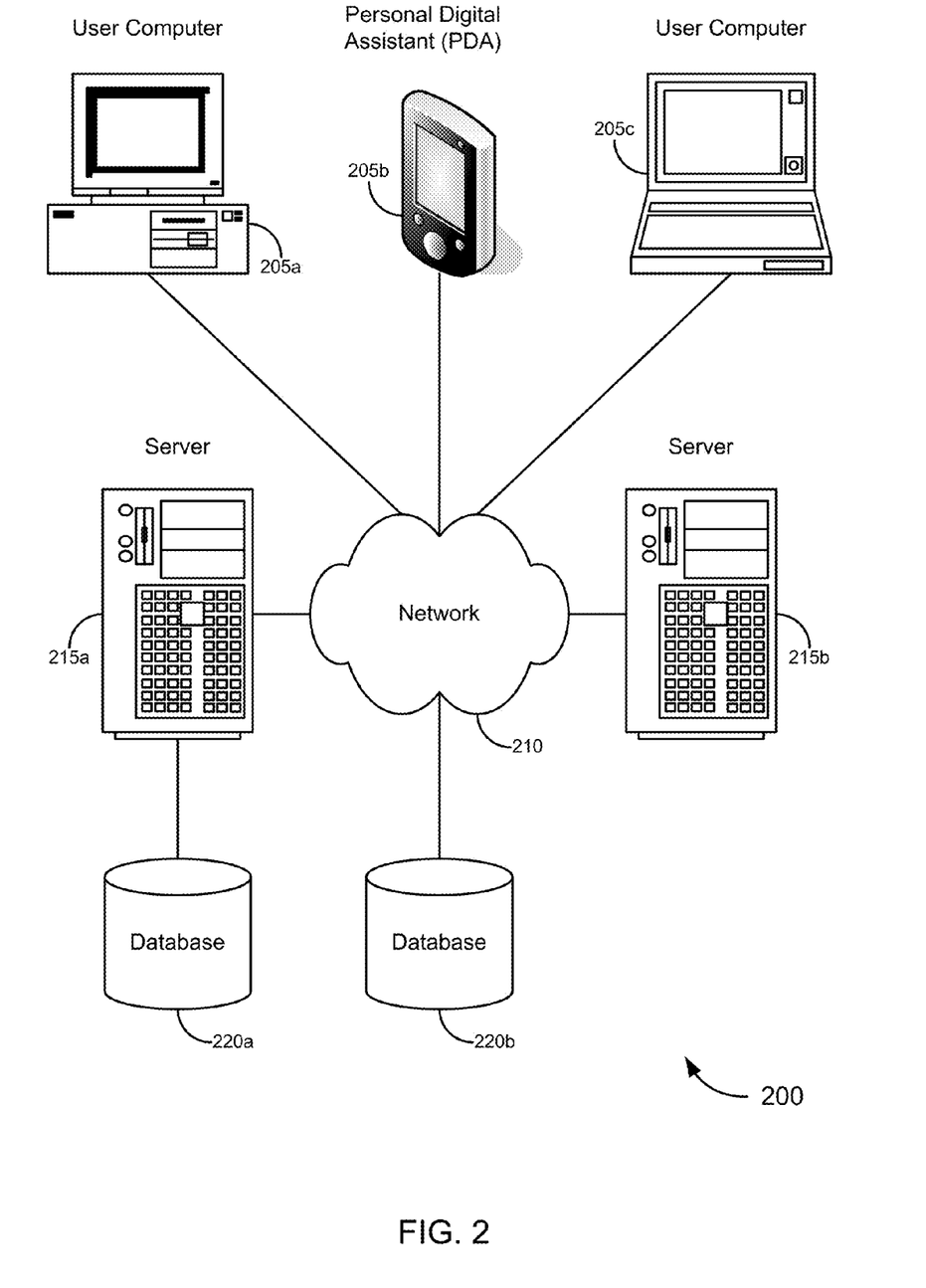
FIG. 2 is a block diagram illustrating a networked system of computers, which can be used in accordance with various embodiments of the present invention.

Merely by way of example, FIG. 2 illustrates a schematic diagram of a system 200 that can be used in accordance with one set of embodiments. The system 200 can include one or more user computers 205. The user computers 205 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 205 can also have any of a variety of applications, including one or more applications configured to perform methods of the invention, as well as one or more office applications, database client and/or server applications, and web browser applications. Alternatively, the user computers 205 can be any other electronic device, such as a thin-client computer, Internet-enabled mobile telephone, and/or personal digital assistant (PDA), capable of communicating via a network (e.g., the network 210 described below) and/or displaying and navigating web pages or other types of electronic documents. Although the exemplary system 200 is shown with three user computers 205, any number of user computers can be supported.

Certain embodiments of the invention operate in a networked environment, which can include a network 210. The network 210 can be any type of network familiar to those skilled in the art that can support data communications using any of a variety of commercially available protocols, including without limitation TCP/IP, SNA, IPX, AppleTalk, and the like. Merely by way of example, the network 210 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infrared network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 215. Each of the server computers 215 may be configured with an operating system, including without limitation any of those discussed above, as well as any commercially (or freely) available server operating systems. Each of the servers 215 may also be running one or more applications, which can be configured to provide services to one or more clients 205 and/or other servers 215.

Merely by way of example, one of the servers 215 may be a web server, which can be used, merely by way of example, to process requests for web pages or other electronic documents from user computers 205. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 205 to perform methods of the invention.

The server computers 215, in some embodiments, might include one or more application servers, which can include one or more applications accessible by a client running on one or more of the client computers 205 and/or other servers 215. Merely by way of example, the server(s) 215 can be one or more general purpose computers capable of executing programs or scripts in response to the user computers 205 and/or other servers 215, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 205 and/or another server 215. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 205 via a web server (as described above, for example). Similarly, a web server might receive web page requests and/or input data from a user computer 205 and/or forward the web page requests and/or input data to an application server. In some cases a web server may be integrated with an application server.

In accordance with further embodiments, one or more servers 215 can function as a file server and/or can include one or more of the files (e.g., application code, data files, etc.) necessary to implement methods of the invention incorporated by an application running on a user computer 205 and/or another server 215. Alternatively, as those skilled in the art will appreciate, a file server can include all necessary files, allowing such an application to be invoked remotely by a user computer 205 and/or server 215. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 220. The location of the database(s) 220 is discretionary. Merely by way of example, a database 220a might reside on a storage medium local to (and/or resident in) a server 215a (and/or a user computer 205). Alternatively, a database 220b can be remote from any or all of the computers 205, 215, so long as the database can be in communication (e.g., via the network 210) with one or more of these. In a particular set of embodiments, a database 220 can reside in a storage-area network ("SAN") familiar to those skilled in the art. (Likewise, any necessary files for performing the functions attributed to the computers 205, 215 can be stored locally on the respective computer and/or remotely, as appropriate.) In one set of embodiments, the database 220 can be a relational database, such as an Oracle™ database, that is adapted to store, update, and retrieve data in response to SQL-formatted commands. The database might be controlled and/or maintained by a database server, as described above, for example.

Figure 3:
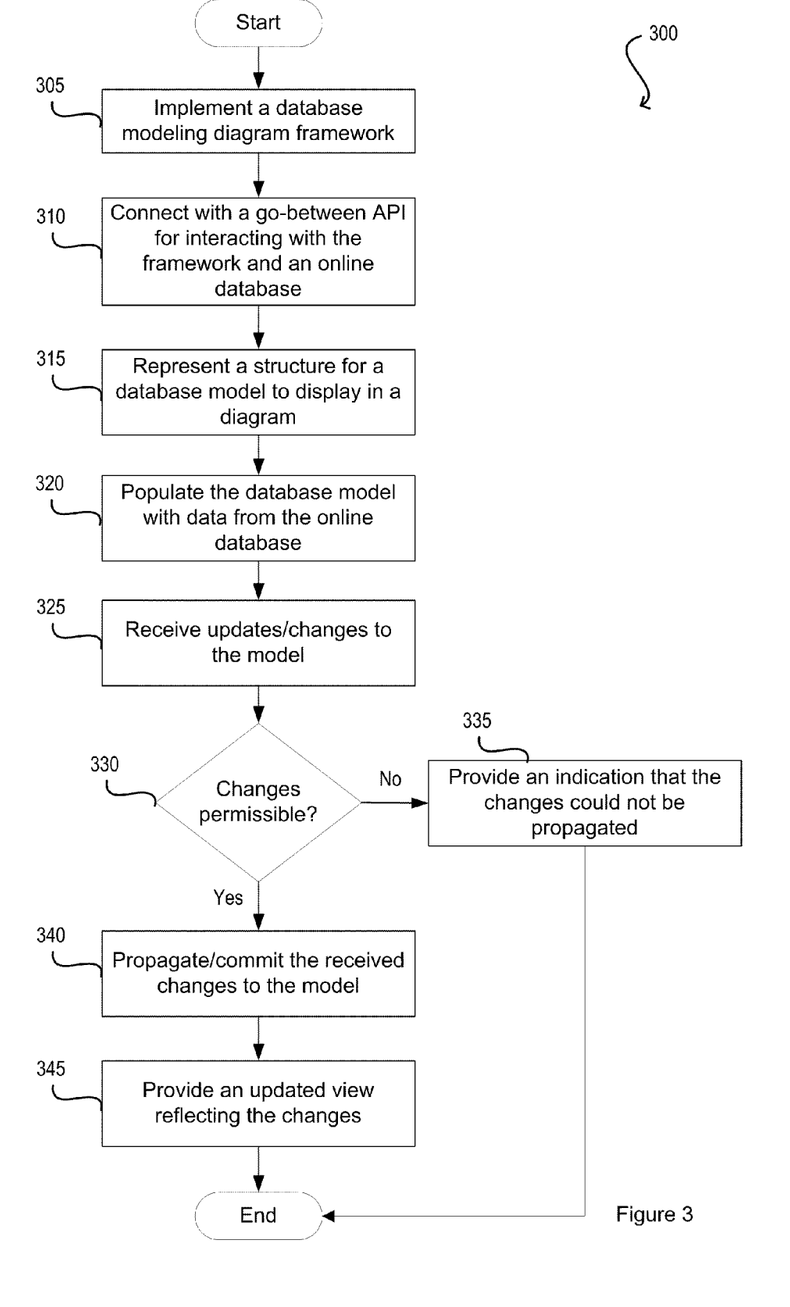
FIG. 3 is a flow diagram illustrating a method of implementing online database modeling, in accordance with embodiments of the present invention.

Turning now to FIG. 3, which illustrates a method 300 of implementing online database modeling, in accordance with embodiments of the present invention. At process block 305, a database modeling diagram framework may be implemented. The framework may provide a graphical representation of database structures. In one embodiment, the graphical representations may include tables, structures, repositories, relations, etc. The framework is configured to provide a database developer (or other user) with the ability to design and change database structures for live online databases. Furthermore, this framework is applicable to any type of online database (e.g., JDBC, SQL server, Sybase, BB2, etc.).

at process block 310, the framework and the online database may be connected (or in communication) via a "go-between" API. Such an API is configured to provide the framework with access to the online database and provide a user with the ability to manipulate the live database structure. The database API may contain a build-in set of rules that are validated against when changes are made. These are in the main common to both online and offline databases. For online databases, the API has some built-in knowledge of what changes are permissible for various types of databases, but as a catch-all it handles errors coming back from the database and displays them to the user. Further, the representation of the database objects is built in the database API. In the case of online databases, depending on the particular database being accessed, they are built from either a set of calls against the JDBC meta data API, or from a set of meta data queries against the data dictionary of the online database.

In a further embodiment, the database API provides the mechanism that allows the database diagram to be agnostic of the objects it is representing. In simple terms, it provides a layer holding a representation of database objects and their properties, and an programmatic interface for manipulating them (create, update, delete, etc.). Anything using the database API through this programmatic interface (including the database diagram) need not be concerned with the mechanics of how to action changes on the offline database or any particular flavor of online database, since the API "knows" how to do that. For example, a change to the representation of a table on a diagram would be sent to the database API and would be actioned through a save to disk of an XML file if the table is an offline table, or generating one or more SQL DDL commands if the table is an online table.

Further, the database API also deals with events. Clients such as the database diagram can register to be notified of events, so that when changes are made to the model, the appropriate notifications can be sent so that the diagram can update the graphical representations. For changes made in the tool, these events are sent immediately. For changes outside the tool (e.g., if someone uses another tool, such as the SQL Plus command line to make a change), the event is not noticed until the object in question is de-referenced and the timestamp is therefore checked.

At process block 315, the structure of the online database may be graphically represented. In one embodiment, the graphical representation may be in a database diagram model, or the like. Furthermore, the graphical representation may be displayed in a same or similar way as in the user interface of FIG. 6.

Accordingly, the framework is configured to populate the graphical database model with live data from the online database (process block 320). The populated data is extracted directly from the database as opposed to first modeling the database and then applying (or synchronized) the model to an offline database. Instead, the actual structure derived directly from the live data within the online database, is extracted and displayed within the framework. Accordingly, any manipulation of the structure (name changes, table creations, column data type changes, column additions, etc.) are reflected directly in the online database. Because live data is being manipulated certain precautions may be maintained. For example, warning, restrictions, graphical notices, or the like may be issued to alert the user of the effects of changes he or she is making to the database design. Such precautions will be described in more detail below.

At process block 325, as the user manipulates the data structure of the online database, changes and/or updates (as described above) to the database model may be received by the framework. Some changes have an effect on the data within the database. For example, if a column's data type is changed from "string" value to a "numerical" values, then certain non-numerical data may be lost. Likewise, if a column is removed the data stored within such a column would be lost. In contrast, renaming a table may not effect live data, but changing table relationships may effect data, or at the very least effect the behavior of the data. Furthermore, some changes may simply be impermissible.

As such, at decision block 330, a determination may be made whether a change/modification is permissible. Alternatively, the determination may be whether the change will have an effect on the live data within the online database. In one embodiment, a dictionary of actions which are categorized in terms of, for example, impermissible, effects data, no effect on data, etc. may be analyzed based on the received change, in order to make the determination. Therefore, if it is determined that the change is impermissible, then at process block 335, an indication (graphical or otherwise) may be provided to the user. For example, a "pop-up" window may notify the users that the change could not be made, and may also provide an explanation.

If the change is permissible, the at process block 340, the received change may be propagated/committed to the model. Furthermore, the related changes to the database may also be made sustainably simultaneously. Accordingly, as the model is changed, the underlying database (and associated data) are also changed. Further, an updated view of the model may also be displayed to the user to reflect the changes made (process block 345). In one embodiment, a "refresh" or similar user interface mechanism may be provided to the user to trigger a redraw to reflect the updated view.

Figure 4:
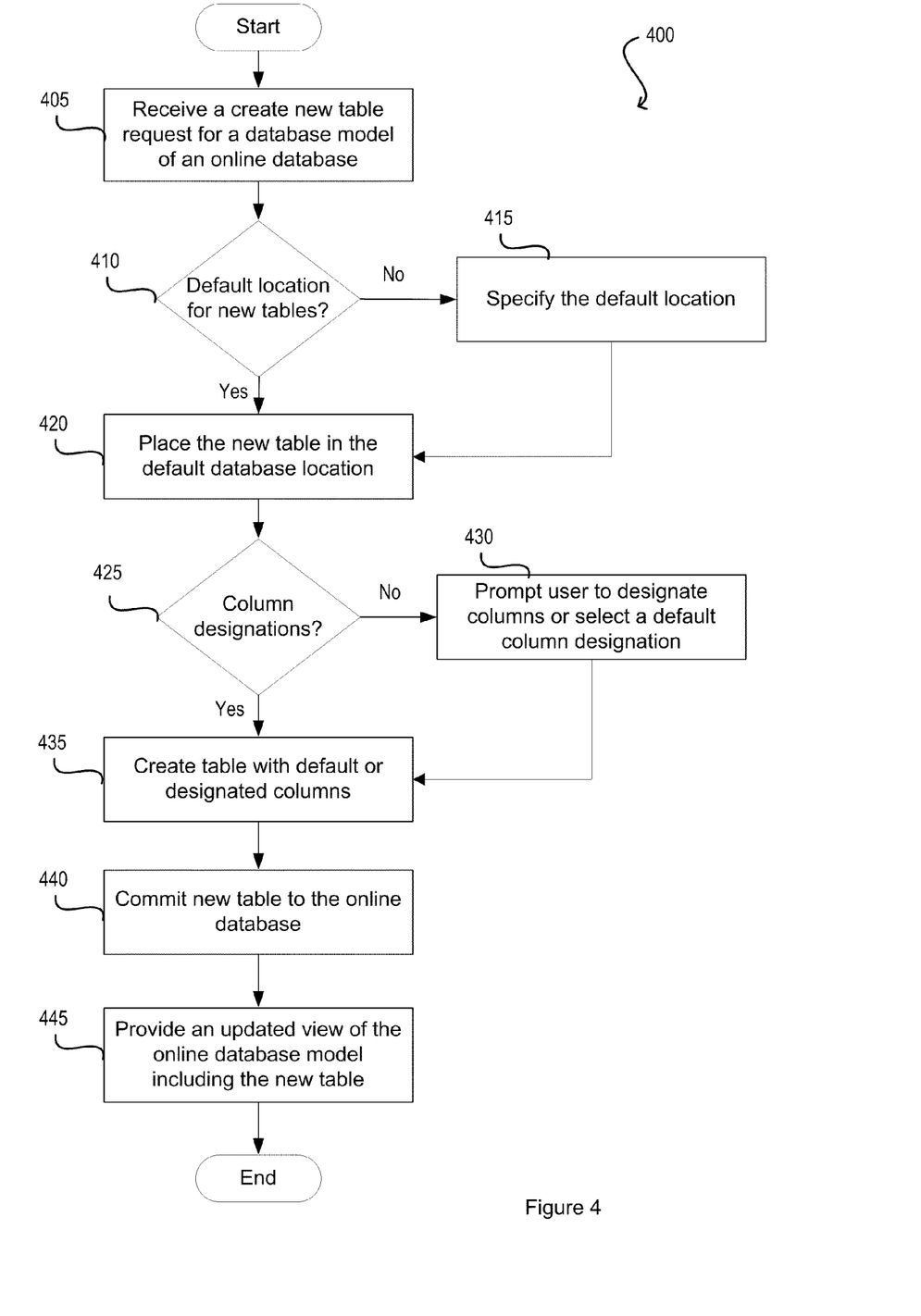
FIG. 4 is a flow diagram illustrating a method of implementing online database modeling, in accordance with further embodiments of the present invention.

Referring next to FIG. 4, which illustrates a method 400 of implementing online database modeling, in accordance with further embodiments of the present invention. At process block 405, a request to create a new table within the online database is received. It should be noted that in addition to creating a table, updating, deleting, etc. actions can also be performed. When dealing with an offline database, "empty" tables may be created, but since the new table will be committed directly to an online database with live data, an empty table will not work. As such, default locations for tables may be created. At decision block 410, it is determined whether a default location for tables has been designated. If a default location has been designated, then at process block 420, the new table is placed in the default database location. Otherwise, the user will be promoted to specify a database location, or select a default location (process block 415).

Continuing to decision block 425, a determination regarding column designations is made. As discussed above, because tables without column designations cannot be created in an online database, is an empty table is created, the user may be prompted to designated columns for the newly created table, or alternatively make a default designation (process block 430). Accordingly, the table is then created with either the default or designated columns (process block 435).

At process block 440, the newly created table is committed to the online database. Accordingly, live data may be populated within the newly created table substantially immediately, without requiring a synchronization with an offline database. As such, at process block 445, an updated view of the online database model including the new table is provided for the user.

Figure 5:
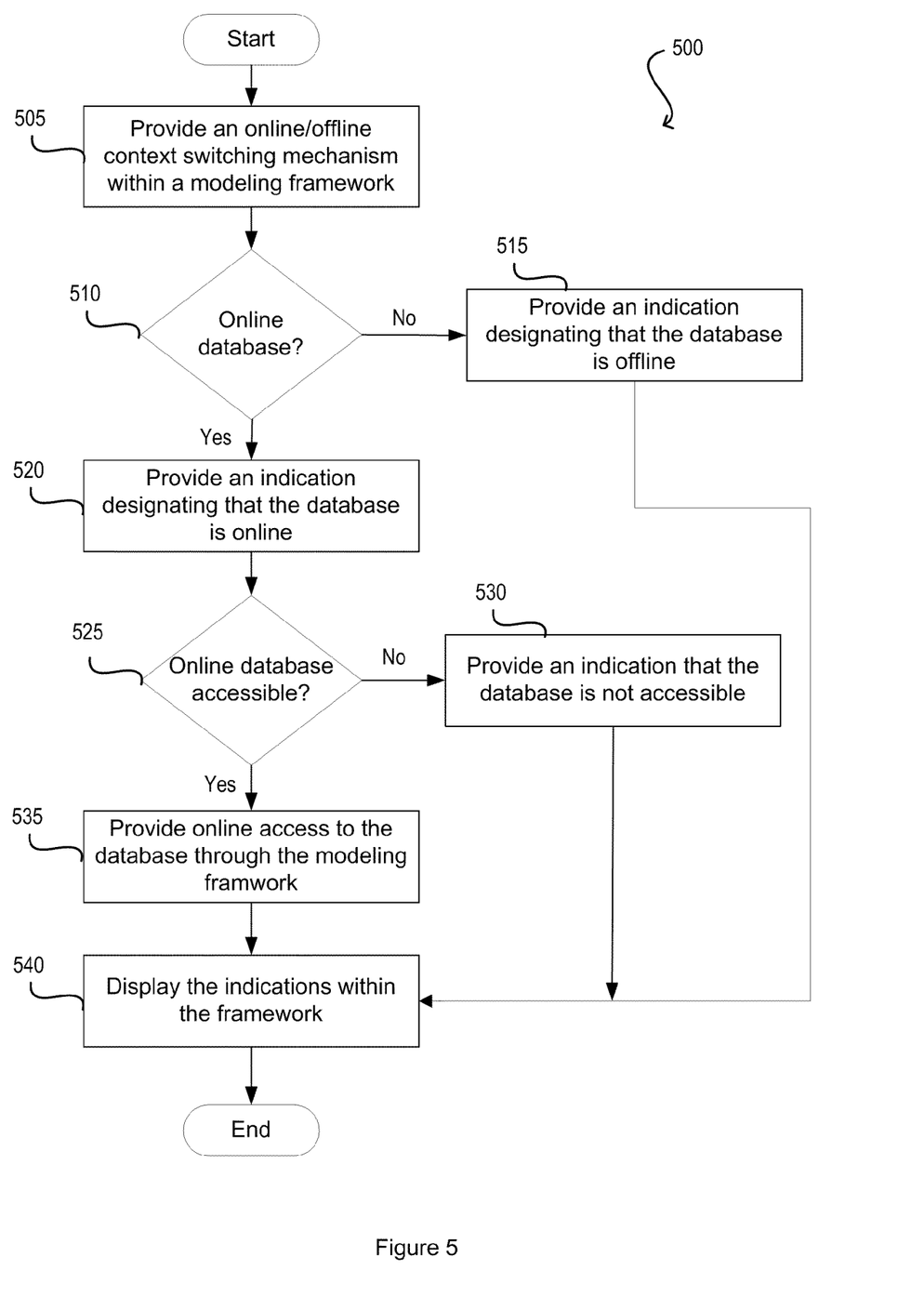
FIG. 5 is a flow diagram illustrating a method of implementing online database modeling, in accordance with further embodiments of the present invention.

Referring now to FIG. 5, which illustrates a method 500 of implementing online database modeling, in accordance with further embodiments of the present invention. At process block 505, an online/offline database context switching mechanism may be providing within the modeling framework. For example, the framework may be configure to not only handle online databases, but also handle offline database connections. As such, certain considerations should be made when displaying database models within the framework. For example, an indication whether the model is for an online or offline may be provided. Furthermore, considerations for when an online database may not be accessible should be made.

As such, as decision block 510, a determination may be made whether the user has selected to manipulate an online or offline database. If the user has selected an offline database then a designation for an offline database may be displayed (process block 515). For example, a graphical icon, or similar designation may be placed within the graphical representation of the database object, which indicates that the database is offline.

Similarly, if the user has selected to manipulate an online database, then a designation should be made to indicate that the database being manipulated is an online database (process block 520). In one embodiment, the rational behind designating that the database is online or offline, is to alert the user of the ramifications of changes made to the database model, in order to avoid loss of data or other related problems.

At decision block 525, a determination may be made whether the online database is accessible. For example, the connection to the database may have failed (e.g., either the network connection to an external database, a software malfunction, or any other connectivity issue). Further, the user of the framework may not have the proper permission to access the online database. In other words, a determination made be made whether the user is unable to access the online database for any reason.

If it is determined that the online database is not accessible, then at process block 530, an indication may be displayed to the user. For example, an "X" or similar designation may be places next to any portion of the database diagram which are effected by the non-accessibility. Otherwise, if the online database is accessible, the online access to the online database may then be provided through the modeling framework (process block 535). Furthermore, at process block 540, the database (online or offline) may be displayed with the determined designation within the graphical interface of the modeling framework.

Figure 6:
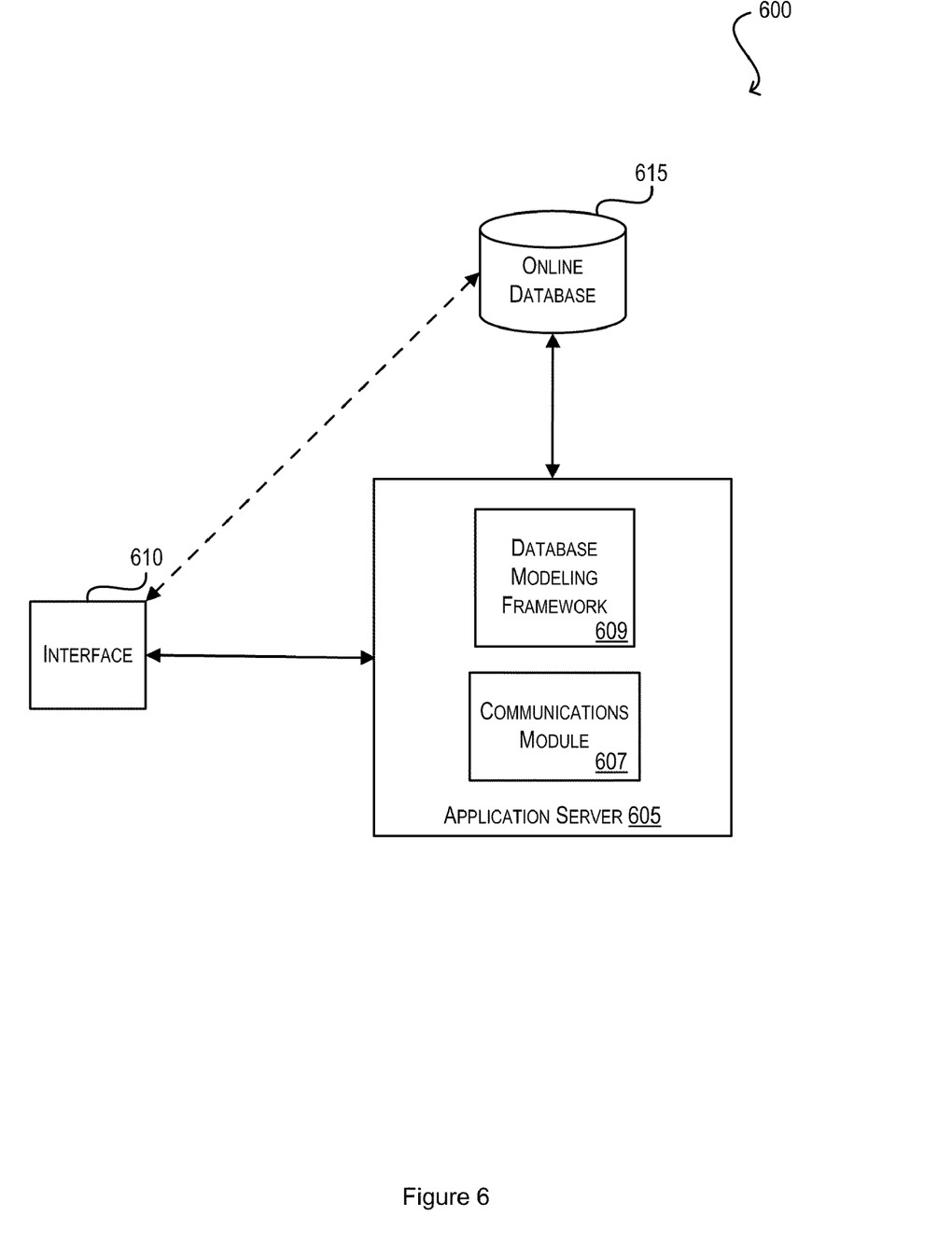
FIG. 6 is a block diagram illustrating a system for implementing online database modeling, in accordance with embodiments of the present invention.

Turning now to FIG. 6, which illustrates a system 600 for implementing online database modeling, in accordance with embodiments of the present invention. The system 600 may includes an application server 605 which includes a communication module 607 and a database modeling framework 609. The application server 605 may be a computer system which provides access to the modeling framework 609, or a server system which provide remote access the modeling framework 609.

Furthermore, the application server 605 may be in communication via communications module 607 with interface 610. In one embodiment, interface 610 may be a "thin" client, but alternatively, the interface 610 may be a "thick' client, in that interface 610 locally implements the database modeling framework 609. Additionally, system 600 includes an online database 615 in communication with application server 605 or interface 610.

In one embodiment, system 600 may be configured to implement any of methods 300, 400, or 500 form FIGS. 3-5. Furthermore, the application server 605, database modeling framework 609 and interface 610 may be implemented according to the computer systems described in either FIG. 1 or 2. As such, system 600 is capable of executing and implementing any aspect of the methods in FIGS. 3-5.

Figure 7:
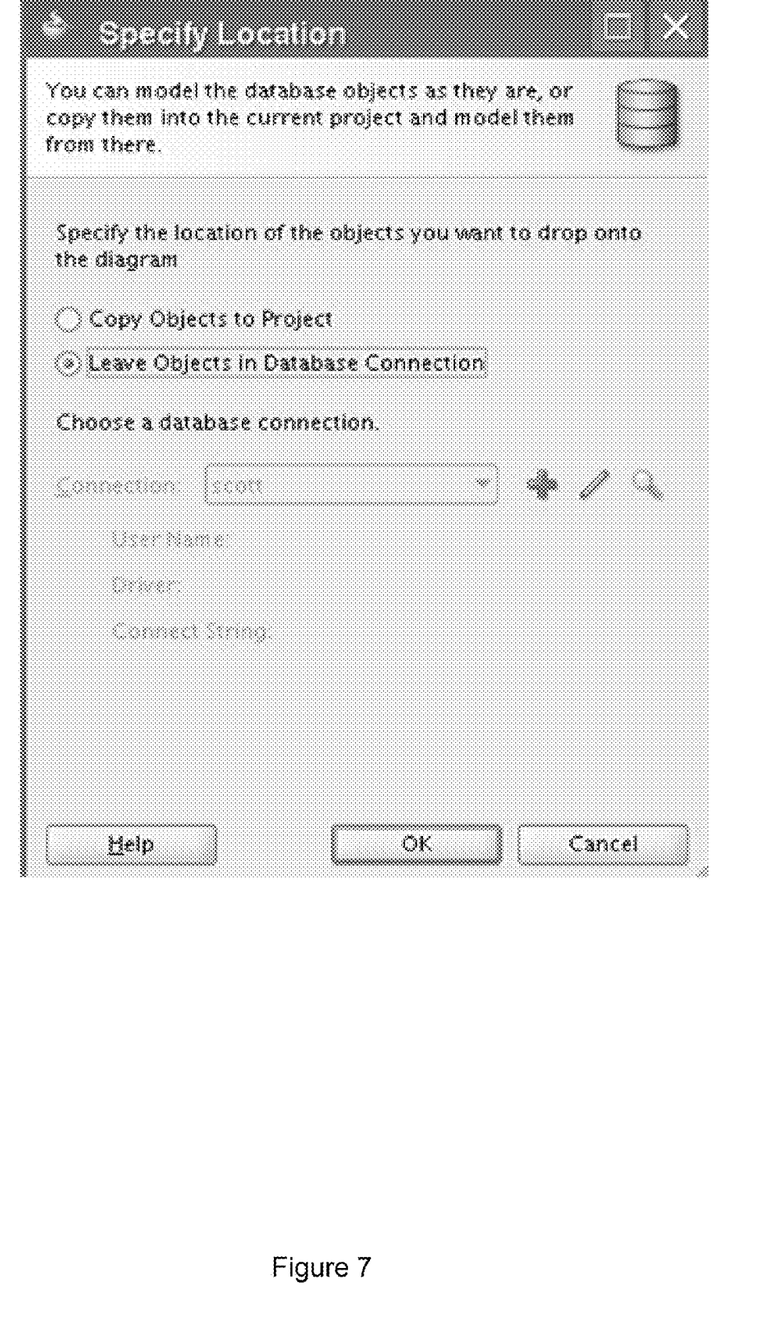
FIG. 7 is a user interface for implementing online database drag and drop, in accordance with another embodiment of the present invention.

Turning now to FIG. 7, which illustrates a user interface for implementing an online database drag and drop. The description fields for the online connection are visible for convenience, but in this example are disabled. For accessibility purposes, we will offer the option of navigating the online database through an add to diagram dialog.

Figure 8:
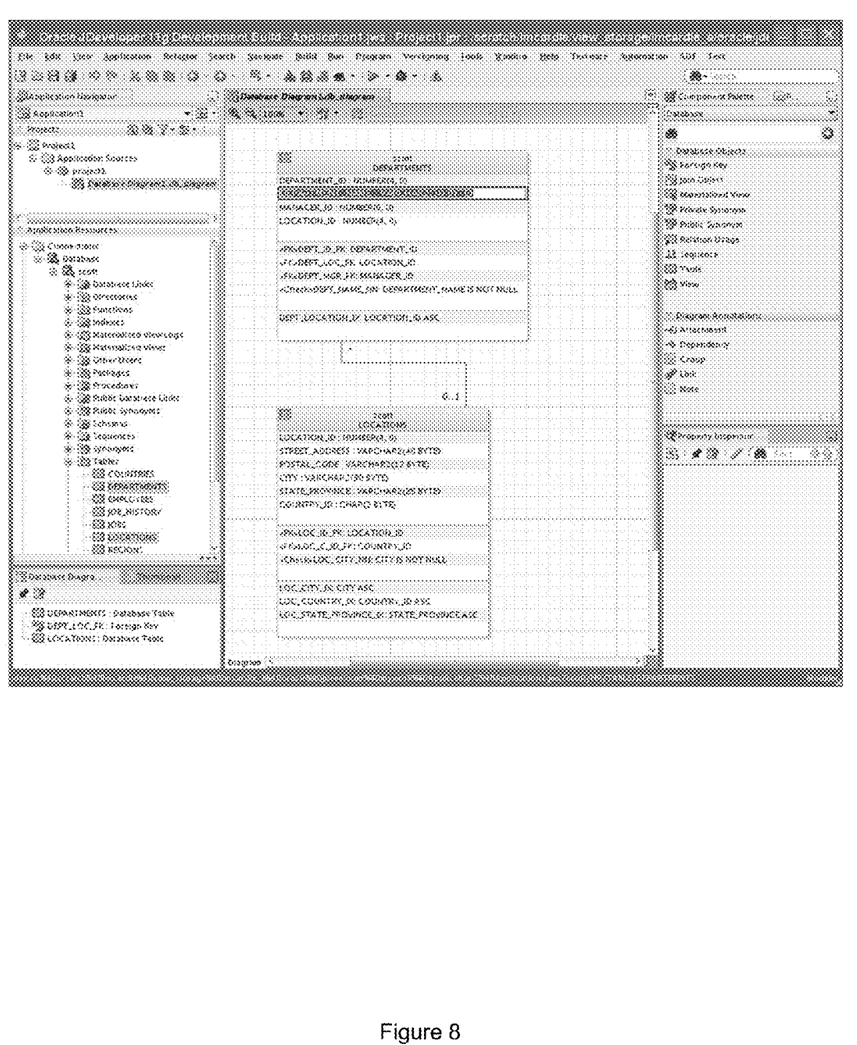
FIG. 8 is a user interface for manipulating online database objects, in accordance with another embodiment of the present invention.

FIG. 8 illustrates a user interface for manipulating online database objects. In one embodiment, FIG. 7 depicts a user interface displaying online objects within a diagram. The live data and information is able to be edited and manipulated directly within the diagram display. For example, as show in FIG. 7, the DEPARTMENTS table is having its name edited, even though it is a table in a live connection.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of implementing online database modeling, the method comprising:

providing a database modeling diagram framework, wherein the framework is in communication with an online database, and wherein the online database provides access to live data;

providing, via an intermediary API, access to the online database for the database modeling diagram framework;

representing a database structure of the online database in a database model within an interface of the database modeling diagram framework;

populating the database model with live data from the online database;

displaying the database model with the live data from the online database within the database modeling diagram framework interface receiving a request to change the database model for the online database;

determining whether the change is impermissible; and displaying an indication within the user interface indicating that the change was not propagated within the online database diagram, otherwise propagating the received changes and providing an updated view of the online database model reflecting the change.

2. The method of implementing online database modeling as in claim 1, wherein the change includes one of: a table deletion, a column deletion, or a variable type change.

3. The method of implementing online database modeling as in claim 1, wherein the online database comprises one or more of: a JDBC database, an SQL server database, a Sybase database, or an Oracle DB2 database.

4. A non-transitory computer-readable medium having sets of instructions stored thereon which, when executed by a computer, cause the computer to:
provide a database modeling diagram framework, wherein the framework is in communication with an online database, and wherein the online database provides access to live data;
provide online access to the online database for the database modeling diagram framework via an intermediary API;
represent a database structure of the online database in a database model within an interface of the database modeling diagram framework;
populate the database model with live data from the online database; and
display the database model with the live data from the online database within the database modeling diagram framework interface;
receive a request to change the database model for the online database, wherein the request is to create a new table within the online database model;
determine whether the change is impermissible; and
display an indication within the user interface indicating that the change was not propagated within the online database diagram, otherwise propagate the received changes and provide an updated view of the online database model reflecting the change.

5. The non-transitory computer-readable medium as in claim 4, wherein the change includes one of: a table deletion, a column deletion, or a variable type change.

6. A system for implementing online database modeling, the system comprising:
a computer system configured to provide a database modeling diagram framework, wherein the framework is in communication with an online database, and wherein the online database provides access to live data; and
an online database in communication with the framework via an intermediary API;
wherein the database modeling diagram framework is configured to represent a database structure of the online database in a database model within an interface of the database modeling diagram framework, populate the database model with live data from the online database, display the database model with the live data from the online database within the database modeling diagram framework interface;
receive a request to change the database model for the online database;
determine whether the change is impermissible; and
display an indication within the user interface indicating that the change was not propagated within the online database diagram, otherwise propagate the received changes and provide an updated view of the online database model reflecting the change.

7. The system for implementing online database modeling as in claim 6, wherein the online database comprises one or more of: a JDBC database, an SQL server database, a Sybase database, or an Oracle DB2 database.

* * * * *

UNITED STATES PATENT AND TRADEMARK OFFICE
CERTIFICATE OF CORRECTION

PATENT NO. : 8,326,902 B2
APPLICATION NO. : 12/869972
DATED : December 4, 2012
INVENTOR(S) : McArdle et al.

Page 1 of 1

It is certified that error appears in the above-identified patent and that said Letters Patent is hereby corrected as shown below:

On sheet 5 of 8, in figure 5, (Box 535), line 3, delete "framwork" and insert -- framework --, therefor.

In column 2, line 48, delete "according" and insert -- According --, therefor.

In column 8, line 56, delete "at" and insert -- At --, therefor.

In column 11, line 46, delete ""thick"" and insert -- "thick" --, therefor.

Signed and Sealed this
Twelfth Day of March, 2013

Teresa Stanek Rea
*Acting Director of the United States Patent and Trademark Office*